US012726675B2

(12) United States Patent
Worthington et al.

(10) Patent No.: US 12,726,675 B2
(45) Date of Patent: Sep. 1, 2026

(54) SYSTEM, METHOD AND COMPUTER PROGRAM FOR DELIVERING VIDEO REACTIONS TO A LIVESTREAM DISPLAY INTERFACE

(71) Applicant: Vimeo.com, Inc., New York, NY (US)

(72) Inventors: Philip Worthington, Brooklyn, NY (US); Sergey Maliuk, Boca Raton, FL (US); Arsenii Pugach, Omsk (RU); Denys Kliatskyi, Kryvyi Rih (UA); Taras Omelianchuk, Sataniv (UA); Mykhailo Smahin, Zaporizhzhiya (UA)

(73) Assignee: Vimeo.com, Inc., New York, NY (US)

( * ) Notice: Subject to any disclaimer, the term of this patent is extended or adjusted under 35 U.S.C. 154(b) by 138 days.

(21) Appl. No.: 18/532,399

(22) Filed: Dec. 7, 2023

(65) Prior Publication Data

US 2024/0196050 A1 Jun. 13, 2024

Related U.S. Application Data

(60) Provisional application No. 63/386,390, filed on Dec. 7, 2022.

(51) Int. Cl.

| | |
|---|---|
| ***H04N 21/44*** | (2011.01) |
| ***H04N 21/2187*** | (2011.01) |
| ***H04N 21/81*** | (2011.01) |

(52) U.S. Cl.

CPC ... *H04N 21/44016* (2013.01); *H04N 21/2187* (2013.01); *H04N 21/8146* (2013.01)

(58) Field of Classification Search

None

See application file for complete search history.

(56) References Cited

U.S. PATENT DOCUMENTS

| | | | | |
|---|---|---|---|---|
| 10,652,618 | B2 * | 5/2020 | Sarkar | H04N 21/2187 |
| 11,290,688 | B1 | 3/2022 | Krol et al. | |
| 11,895,167 | B2 * | 2/2024 | Lanier | H04N 7/152 |
| 2016/0234551 | A1 * | 8/2016 | Allegretti | H04N 21/854 |
| 2020/0225844 | A1 * | 7/2020 | Lerner | G06F 3/0482 |
| 2022/0086203 | A1 | 3/2022 | Morris et al. | |
| 2022/0270556 | A1 * | 8/2022 | Neumeier | G09G 3/3225 |
| 2022/0353220 | A1 * | 11/2022 | Balaji | H04L 12/1831 |
| 2025/0142132 | A1 * | 5/2025 | Yerli | H04N 7/157 |

OTHER PUBLICATIONS

International Patent Application No. PCT/US2023/083014; Int'l Search Report and the Written Opinion; dated Apr. 5, 2024; 16 pages.

* cited by examiner

*Primary Examiner* — Junior O Mendoza

(74) *Attorney, Agent, or Firm* — BakerHostetler

(57) ABSTRACT

A system and/or method for efficiently playing a multitude of short looping videos at the same time on a client's browser screen (or live event interface) by leveraging the GPU capabilities instead of relying on traditional video/GIF playback methods. In a specific embodiment the looping videos are implemented as GPU compressed textures (e.g., using KTX2 compression).

5 Claims, 3 Drawing Sheets

SYSTEM, METHOD AND COMPUTER PROGRAM FOR DELIVERING VIDEO REACTIONS TO A LIVESTREAM DISPLAY INTERFACE

CROSS-REFERENCE TO RELATED APPLICATIONS

This application claims the benefit of U.S. Provisional Application No. 63/386,390, filed Dec. 7, 2022, which is hereby incorporated by reference herein in its entirety.

BACKGROUND

As the popularity of remote events (such as video-conferences, live-streamed events and the like) that include live-streaming content to a multitude of client devices in real-time over the Internet increases, there exists a technical problem for the display interfaces on such client devices to be able to represent/display a multitude of real-time video reactions to the content in the same display interface that provides the live-streamed content. Current browsers and associated personal computing systems are not able to render many instances of GIF, WebP or MP4 videos in the same display due to memory and processing limitations. This problem may be further complicated in instances of Internet connection instability and speed; network buffering/bandwidth caps; and/or video quality and file size.

It would be desirable to provide a system in which dozens or hundreds of video reactions (e.g., from very large audiences) can be presented on the same live-streaming display on such client devices without significant bogging down of the client devices' computing resources.

SUMMARY

The current disclosure provides the ability to simulate a large audience for an online live event by approximating the "live" camera feeds on the client's browser screen (or live event interface) in which the live event server sends to the clients' a subset of video frames (instead of the full live video). In such a case, the looping videos described above and implemented as GPU compressed textures on the clients' browser/live-interface screen may include, for example, the subset of video frames received by the live event server.

In an aspect, a system, method or computer program (stored on a non-transitory memory device) for delivering video reactions to a livestream display interface includes (or in the case of the computer program computer instructions for): receiving a reaction video/animation by a server; extracting all or a subset of video frames from the reaction video/animation by the server; compressing, by the server, the frames (such as into KTX2) to generate a reaction atlas; transmitting the reaction atlas to a client device for insertion of reaction atlas into a computerized livestream display interface provided by the client device during the livestream, the computerized livestream display interface including an arrangement of a plurality of reaction atlases from a corresponding plurality of client devices.

In an embodiment, the client device is configured to display the reaction atlas at a framerate to simulate the reaction video. Alternatively, or in addition, the reaction video is an animation video selected by the user (such as a GIF image or an MP4 video). Alternatively, or in addition, the reaction video is from a camera feed (such as from a webcam feed from a client device). Alternatively, or in addition, the server scales the frames to fit in an arrangement with a plurality of reactions on a livestream display interface. Alternatively, or in addition, the server transmits metadata (such as in a JSON file, and including metadata such as framerate, frame size and the like) associated with the reaction atlas to the client device. Alternatively, or in addition, the system, method or computer program further includes storing by the client device the reaction atlas (such as in WebGL memory) for use or reuse with the computerized livestream display interface. Alternatively, or in addition, the client device and/or the server is configured to position or size (such as make larger/smaller or more/less prominent with respect to other of the plurality of reactions in the arrangement) the reaction atlas in the arrangement in the computerized livestream display interface based upon reaction signal associated with the reaction atlas (such as a new reaction signal, user is speaking signal, another user is speaking signal and the like) received by the client device. Alternatively, or in addition, the client device is notified (such as by a realtime messaging service) by the server that a new reaction video has been created prior to transmitting the reaction atlas to the client device. Alternatively, or in addition, the client device stores the reaction atlas in GPU memory, and the GPU processes the reaction atlas using a GPU application that moves/scales the textures.

In another first aspect, a system, method or computer program (stored on a non-transitory memory device) for providing a live event display interface for a client computing device includes (or in the case of the computer program computer instructions for): storing a plurality of compressed reaction atlases (such as in KTX2 format) in a GPU memory representing a corresponding plurality of audience participants to the live event; processing the plurality of reaction atlases for by the GPU using an application that moves/scales the textures to simulate a video or animation for each of the plurality of reaction atlases; and displaying by the plurality of reaction atlases as simulated videos or animations in the live event display interface.

These and other aspects and advantages of the current disclosure will be apparent from the following description, the appended claims and the attached drawings.

BRIEF DESCRIPTION OF THE DRAWINGS

The accompanying drawings, which are incorporated in and constitute a part of this specification, illustrate various embodiments of the disclosure and, together with the general description of the disclosure given above, and the detailed description of the embodiments given below, serve to explain exemplary embodiments of the invention(s).

DETAILED DESCRIPTION

Figure 1:
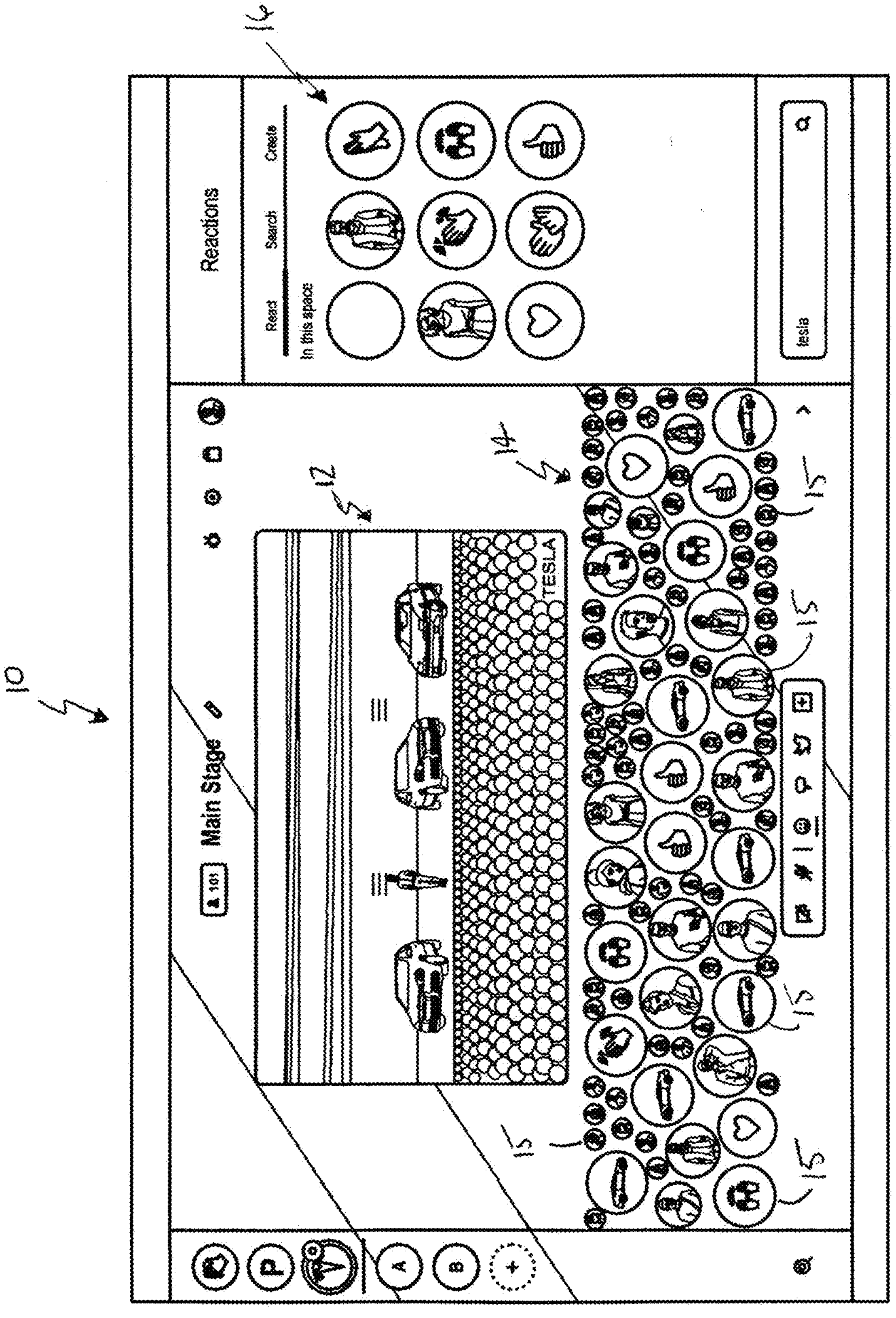
FIG. 1 provides an example display interface for a video-conference, video-streaming or remote-event according to the current disclosure.

The current disclosure provides a system and/or method for efficiently playing a multitude of short looping videos at the same time on a client's browser screen (or live event interface) by leveraging the GPU capabilities instead of relying on traditional video/GIF playback methods. In a specific embodiment the looping videos are implemented as GPU compressed textures (e.g., using KTX2 compression).

In the same manner, the current disclosure provides the ability to simulate a large audience for an online live event by approximating the "live" camera feeds on the client's browser screen (or live event interface) in which the live event server sends to the clients' a subset of video frames (instead of the full live video). In such a case, the looping videos described above and implemented as GPU compressed textures on the clients' browser/live-interface screen may include, for example, the subset of video frames received by the live event server.

In some embodiments, each client's browser/live-interface screen may be configured to display a highly variant number of people/reactions in the browser/interface as an arrangement of people/reactions using a physics-based layout algorithm that can amplify (e.g., enlarge, bring-to-front, bring-to-center, etc.) certain of the people/reactions in the displayed arrangement versus others in the arrangement depending upon which of the displayed people/reactions are considered important by the algorithm. As will be understood, the system/method becomes more efficient as many of the same reactions are playing simultaneously (this is a common use case as people tend to mirror the reactions of others in a wave type effect).

The current disclosure provides a system and/or method for delivering short video reactions in a scalable way by combining frames as a grid in a single image and distributing that to clients in a format that is efficient to download and deliver into WebGL memory.

The current disclosure provides a system, method or computer program for delivering video reactions to a livestream display interface, that performs the following steps: receiving a reaction video/animation by a server; extracting all (e.g., in the case of very short videos) or a subset (e.g., in the case of longer videos) of video frames from the reaction video/animation by the server; scaling, by the server, the frames to fit in an arrangement with a plurality of reactions on a livestream display interface—rendering an reaction atlas; and transmitting the reaction atlas to a client device for insertion into computerized livestream display interface provided by the client device during the livestream. The client device may be configured to display the reaction atlas in the computerized livestream display interface at a framerate to simulate the reaction video. The reaction video may be an animation video selected by the user (such as a GIF image or an MP4 video) and/or the reaction video may be from a camera feed (such as from a user's webcam feed). The server may compress the arrangement (such as into KTX2) prior to transmitting to a client device. The server may transmit metadata (such as in a JSON file, and including metadata such as framerate, frame size and the like) associated with the arrangement to the client device. The client device may store the arrangement (such as in WebGL memory) for use or reuse with the computerized livestream display interface. The server may be configured to position or size (such as make larger/smaller, bring-to-front/move-to-back, bring-to-center/move-away-from-center, or otherwise more/less prominent with respect to other of the plurality of reactions in the arrangement) the reaction atlas in the arrangement based upon a reaction signal associated with the reaction atlas (such as a new reaction signal, user is speaking signal, another user is speaking signal and the like) received by the client device. The client device may be notified (such as by a realtime messaging service) by the server that a new reaction video has been created prior to transmitting the reaction atlas to the client device. The client device may then display a plurality of the reaction atlases in a grid or arrangement in the live event interface as simulated videos/animations and are implemented as GPU compressed textures (e.g., using KTX2 compression); thereby conserving CPU processing.

Figure 4:
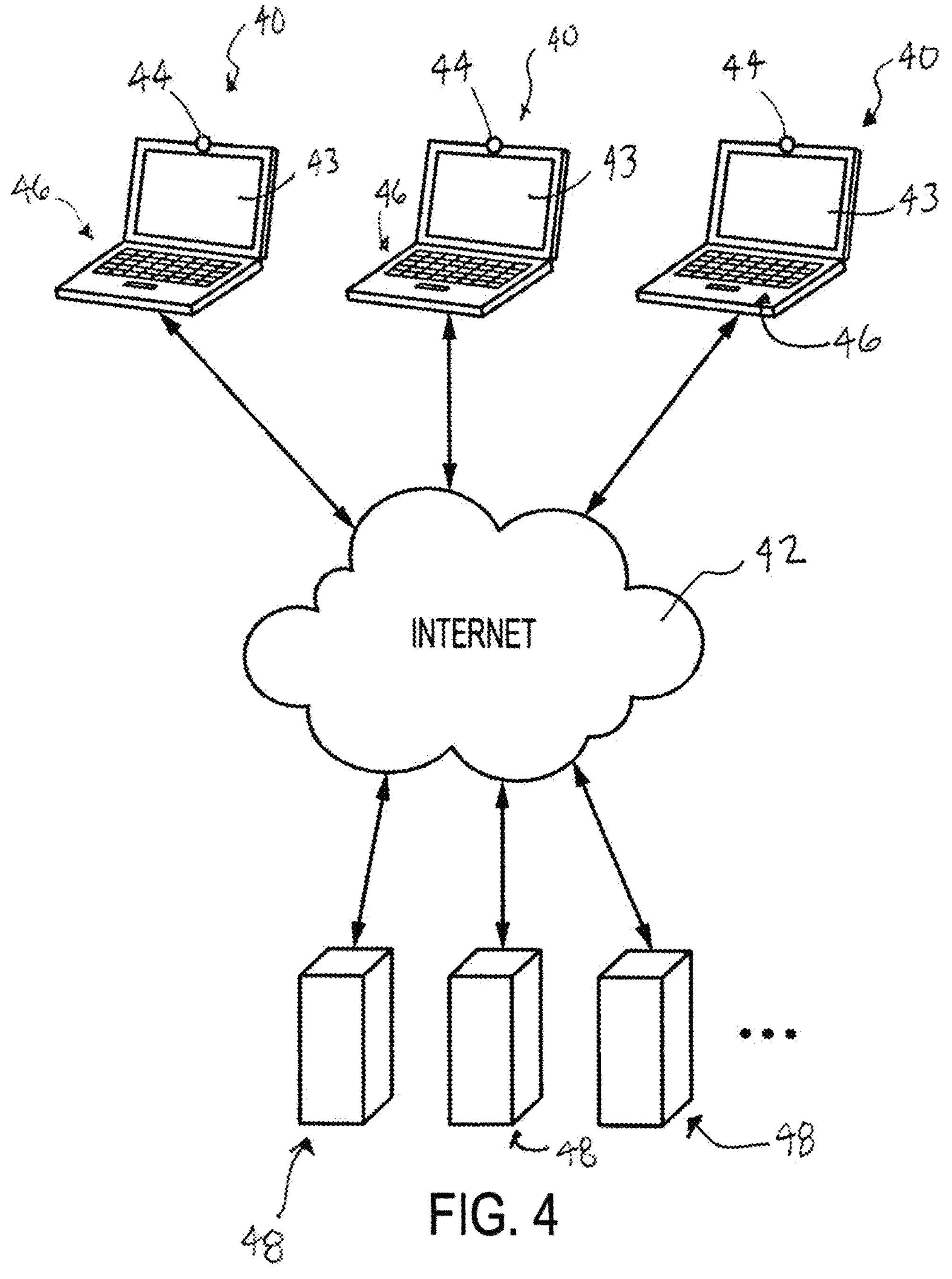
FIG. 4 provides an exemplary diagram of a video-conference, video-streaming or remote-event environment according to the current disclosure.

FIG. 4 provides an exemplary diagram of a video-conference, video-streaming or remote-event environment. In such an environment a plurality of client devices 40 are communicatively coupled to a computer network (such as the Internet 42). Such client devices 40 may include any form of computing device (e.g., laptop computer, tablet computer, smartphone, desktop computer and the like) having a display 43 and associated Web browsing software for providing to the user a user interface display of the remote event, such as shown in FIG. 1. Some or all of such computing devices may also include cameras 44 (e.g., webcams) and user input components 46 (e.g., a mouse, keyboard, touchscreen, microphone and the like) as is well known in the art. Also depicted in FIG. 4 are one or more server computers 48, which may provide, for example, the live-streaming content, reaction videos and so forth as described herein to each of the client devices 40.

FIG. 1 provides an example display interface 10 for the video-conference, video-streaming or remote-event, that may include a main display window 12 (e.g. for displaying a primary livestream or video-conference stream), an arrangement, array, or grid 14 of reaction atlases 15 (where the grid 14 may also include some static images) and a menu 16 for a user to select, search or create a reaction to be displayed on other users' grids 14. Using the menu 16 (or by some other input mechanism) a user may post a reaction during the event or stream that may be either a short video from the user's camera 44 or a selected Giphy, MP4, GIF or URL (or the like). This reaction is sent by the client device 40 to a back-end service on a server(s) 48 (via the Internet 42 or some other form of data or network transfer, for example) which extracts a subset of frames from the reaction (using FFMPEG, for example). The back-end service on the server(s) 48 then resizes the subset of frames to fit as best as possible in an atlas 15, and may also reposition the subset of frames within the atlas 15. The server(s) 48 may be configured to position or size (such as make larger/smaller or more/less prominent with respect to other of the plurality of reaction atlases 15 in the grid 14) the reaction atlas 15 in the grid 14 based upon reaction signal associated with the scaled subset of frames (such as a new reaction signal, user is speaking signal, another user is speaking signal and the like) received by the client device. The back-end service on the server(s) 48 may then compress the reaction atlas 15 (for example, into KTX2—basis universal—which is optimized for efficient memory handling in WebGL across a wide range of GPUs) format. A companion metadata file (for example, JSON file) is created by the back-end service on the server(s) 48 with metadata such as framerate and frame size. All clients 40 are then notified (via a realtime messaging service or by some other form of communication) by the back-end service on the server(s) 48 that a new reaction atlas 15 has been created. The compressed reaction atlas 15 is then downloaded (along with any companion meta data file(s)) by each client 40 and saved into GPU memory for use in the display interface 10 (the KTX format makes this very efficient as it is pre-compressed).

On the client device 40, frames of the subset for each reaction 15 are displayed at a specified framerate so the reaction appears to the user as a video. This displaying at a specified framerate can be performed by the GPU using a GLSL shader that moves/scales the texture, focusing on the individual frames.

Figure 2:
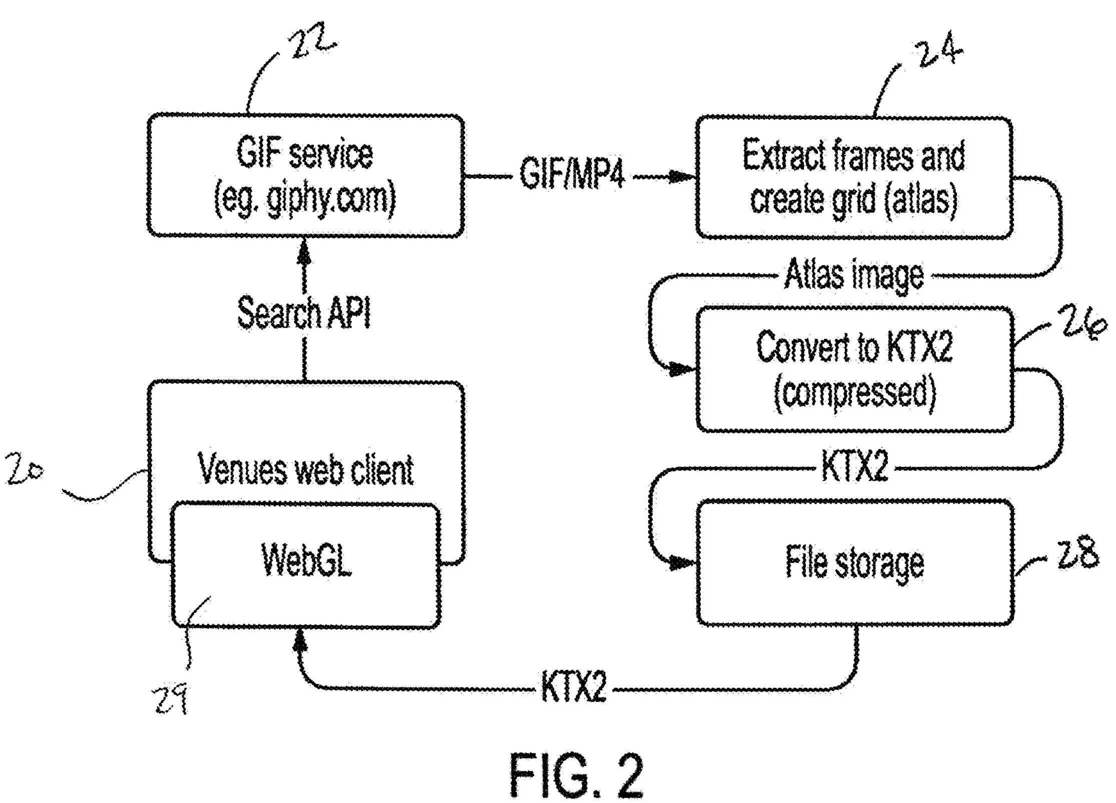
FIG. 2 provides an exemplary flow diagram for displaying a large number of animated reactions simultaneously in a browser with minimal performance overhead according to the current disclosure.

FIG. 2 provides an exemplary flow diagram for displaying a large number of animated reactions simultaneously in a browser with minimal performance overhead. In block 20, during an event, a user would select a reaction animation (such as by using a menu 16 in the Venues web client interface 10). The web client would utilize a Search API to access the associated reaction animation/video from a GIF service (such as giphy.com) in block 22. In block 24, the accessed reaction animation (e.g., GIF/MP4) would have frames extracted to create the reaction atlas 15. In block 26, the reaction atlas 14 would be compressed/converted to KTX2 and in block 28, the compressed reaction atlas would be saved in file storage and sent to the client devices 40 for storage in WebGL storage as shown in block 29. Using this procedure, many reactions can be played simultaneously utilizing primarily the GPU processing (e.g., using a GLSL shader that moves/scales the texture) with minimal performance impact on the client's CPU.

Figure 3:
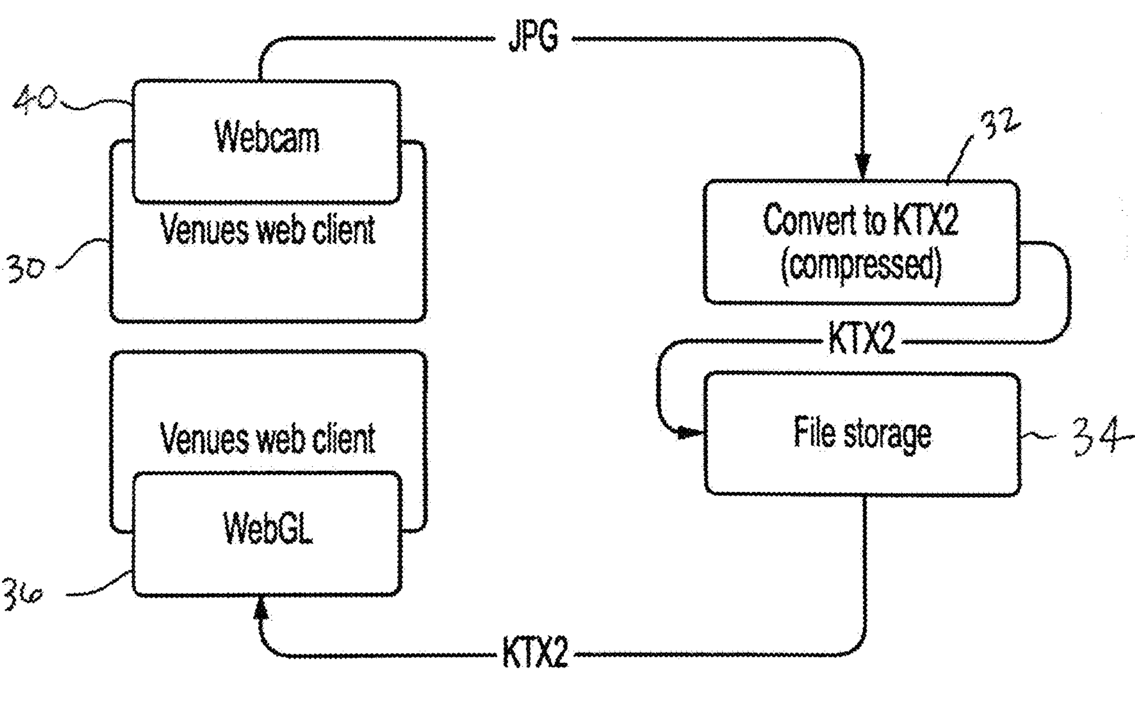
FIG. 3 provides an exemplary flow diagram for displaying a large number of near-live webcam videos/images simultaneously in a browser (or other computer interface) with minimal performance overhead according to the current disclosure.

FIG. 3 provides an exemplary flow diagram for displaying a large number of near-live webcam videos/images simultaneously in a browser (or other compute interface) with minimal performance overhead. In block 30, during an event, a webcam 44 on a client device 40 would capture an image (such as a JPG) or short video (such as MP4) which is transmitted to a server 48 and converted/compressed to KTX2 in block 32 (if a video, the server 48 can extract frame(s) as in FIG. 2 process). In block 34 the compressed atlas image 15 would be saved in file storage and sent to the client devices 40 for storage in WebGL storage as shown in block 36. Again, using this procedure, many simulated live video feeds (the atlas images 15) can be played simultaneously utilizing primarily the GPU processing (e.g., using a GLSL shader that moves/scales the texture) with minimal performance impact on the client's CPU. Using this procedure, many webcam captures can be displayed simultaneously with minimal performance impact.

Technical Solution(s): As a result of the above disclosure, there is negligible difference from a performance perspective whether 1 or 1000 users are playing this reaction/atlas and very high framerates can be achieved irrespective of the level of audience/reaction activity (this would not be possible if the servers tried to provide this reaction atlas by rendering may instances of GIFs, WebPs and/or MP4s in a browser). The audience/reaction visualization is capable of scaling from very small (video-conference size) to very large (live performance size) audiences without pagination. In embodiments, thousands of users may have their cameras 44 enabled during a live event, where the "videos" from the cameras may be delivered as compressed subset frames in an atlas 15 that is delivered by the server(s) 48 to the client devices 40 in bulk.

In general, the routines executed to implement the embodiments of the disclosure, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a communication network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the disclosure. Moreover, any of the flowcharts, sequence diagrams, and/or block diagrams may include more or fewer blocks than those illustrated consistent with embodiments of the disclosure.

The terminology used herein is for the purpose of describing particular embodiments only and is not intended to be limiting of the embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While the disclosure has been illustrated by a description of various embodiments and while these embodiments have been described in detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for delivering video reactions to a livestream display interface, comprising (or comprising computer instructions for):

receiving at least one of a reaction video or reaction animation by a server, the at least one reaction video or reaction animation including video frames;

extracting a subset of or all of video frames from the at least one reaction video or reaction animation by the server to provide extracted frames;

compressing, by the server, the extracted frames to generate a reaction atlas; and transmitting the reaction atlas to a client device for insertion of the reaction atlas into a computerized livestream display interface provided by the client device during the livestream, the computerized livestream display interface including an arrangement of a plurality of reaction atlases from a corresponding plurality of client devices, wherein the client device is notified by the server that a new reaction video has been created prior to transmitting the reaction atlas to the client device.

2. The method of claim 1, wherein the client device is notified by a realtime messaging service.

3. A non transitory memory device comprising computer instructions configured to instruct one or more computer processors to perform a method including:

receiving at least one of a reaction video or reaction animation, the at least one reaction video or reaction animation including video frames;

extracting a subset of or all of video frames from the at least one reaction video or reaction animation to provide extracted frames;

compressing the extracted frames to generate a reaction atlas; and transmitting the reaction atlas to a client device for insertion of the reaction atlas into a computerized livestream display interface provided by the client device during the livestream, the computerized livestream display interface including an arrangement of a plurality of reaction atlases from a corresponding plurality of client devices, wherein the computerized instructions are further configured to position or size the reaction atlas in the arrangement in the computerized livestream display interface based upon a reaction signal associated with the reaction atlas received by the client device, and wherein the computerized instructions are further configured to transmit a notification to the client device that a new reaction video has been created prior to transmitting the reaction atlas to the client device.

4. A system, comprising at least one server and a plurality of client devices communicating with the at least one server via a network, wherein:

the at least one server receives at least one of a reaction video or reaction animation from at least a first one of the plurality of client devices, the at least one reaction video or reaction animation including video frames;

the at least one server extracts a subset of or all of video frames from the at least one reaction video or reaction animation to provide extracted frames;

the at least one server compresses the extracted frames to generate a reaction atlas;

the at least one server transmits the reaction atlas to at least a second one of the plurality of client devices; and the at least a second one of the plurality of client devices inserts the reaction atlas into a computerized livestream display interface during the livestream, the computerized livestream display interface including an arrangement of a plurality of reaction atlases from the plurality of client devices, wherein the at least a second one of the plurality of client devices is notified by the at least one server that a new reaction video has been created prior to transmitting the reaction atlas to the at least a second one of the plurality of client devices.

5. The system of claim 4, wherein the at least a second one of the plurality of client devices is notified by a realtime messaging service.

* * * * *